United States Patent
Novak et al.

(10) Patent No.: US 8,640,210 B2
(45) Date of Patent: Jan. 28, 2014

(54) DISTRIBUTED COMPUTER SYSTEMS WITH TIME-DEPENDENT CREDENTIALS

(75) Inventors: Mark Novak, Newcastle, WA (US); Paul J. Leach, Seattle, WA (US); Yi Zeng, Bothell, WA (US); Saurav Sinha, Kirkland, WA (US); K Michiko Short, Renton, WA (US); Gopinathan Kannan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 10 days.

(21) Appl. No.: 13/224,257

(22) Filed: Sep. 1, 2011

(65) Prior Publication Data
US 2013/0061301 A1    Mar. 7, 2013

(51) Int. Cl.
G06F 21/00    (2013.01)
H04L 9/32     (2006.01)
H04L 9/00     (2006.01)
H04L 29/06    (2006.01)
G06F 15/00    (2006.01)

(52) U.S. Cl.
USPC ........ 726/6; 726/7; 380/44; 380/45; 380/281; 380/286

(58) Field of Classification Search
USPC ............................. 726/6; 380/44, 45, 281, 286
See application file for complete search history.

(56) References Cited

U.S. PATENT DOCUMENTS

| | | | |
|---|---|---|---|
| 7,360,096 B2 | 4/2008 | Bracewell | |
| 7,644,275 B2 | 1/2010 | Mowers | |
| 7,698,381 B2 | 4/2010 | Brezak | |
| 7,784,089 B2 | 8/2010 | Lundblade | |
| 8,059,814 B1 | 11/2011 | Duane | |
| 2004/0098609 A1* | 5/2004 | Bracewell et al. ............ | 713/200 |
| 2004/0117386 A1 | 6/2004 | Lavender | |
| 2005/0097330 A1 | 5/2005 | Lundblade | |

(Continued)

FOREIGN PATENT DOCUMENTS

GB    2247964 A  *  3/1992

OTHER PUBLICATIONS

Bauer, L.; Limin Jia; Sharma, D.; "Constraining Credential Usage in Logic-Based Access Control"; Computer Security Foundations Symposium (CSF), 2010 23rd IEEE Digital Object Identifier: 10.1109/CSF.2010.18; Publication Year: 2010; pp. 154-168.*

(Continued)

*Primary Examiner* — Kambiz Zand
*Assistant Examiner* — Courtney Fields
(74) *Attorney, Agent, or Firm* — Chin IP, PLLC; Davin Chin

(57) ABSTRACT

A distributed system in which time-dependent credentials are supplied by controllers that operate according to different local times. Errors that might arise from the controllers generating inconsistent credentials because of time skew are avoided by identifying credentials generated during transition intervals in which different ones of the controllers may generate different credentials at the same absolute time. During a transition interval, controllers and other devices may use credentials differentially based on the nature of the authentication function. Each controller may periodically renew its credentials based on self-scheduled renewals or based on requests from other devices, such that renewal times are offset by random delays to avoid excessive network traffic. Controllers may determine which credential is valid for any given time, based on a cryptographically secure key associated with that time and information identifying the entity that is associated with that credential.

20 Claims, 10 Drawing Sheets

(56) References Cited

U.S. PATENT DOCUMENTS

| | | | |
|---|---|---|---|
| 2005/0160264 | A1 | 7/2005 | Kuhn |
| 2006/0005010 | A1 | 1/2006 | Olsen |
| 2007/0186115 | A1 | 8/2007 | Gao et al. |
| 2009/0110200 | A1 | 4/2009 | Srinivas |
| 2010/0095363 | A1 | 4/2010 | Gong |
| 2011/0113476 | A1 | 5/2011 | Moutarazak |
| 2011/0296510 | A1* | 12/2011 | Hatlelid et al. ............ 726/7 |
| 2012/0047563 | A1* | 2/2012 | Wheeler ................... 726/6 |

OTHER PUBLICATIONS

Fumy, Walter et al. "Principles of Key Management" IEEE Journal on selected areas in communications, Jun. 1993, vol. 11, No. 5 pp. 785-793.

Windows Server 2008 "Understanding the Identity Management for UNIX Components" Feb. 8, 2011 http://programming4.us/desktop/2564.aspx.

Event ID 32772 "Trust Creation" Published Nov. 25, 2009 http://technet.microsoft.com/en-us/library/ee410841(WS.10).aspx.

"Accessing resources across domains"—Published Jan. 21, 2005 http://technet.microsoft.com/en-us/library/cc787646(WS.10).aspx.

Microsoft Windows Common Criteria Evaluation—Retrieved Date: Jul. 14, 2011 http://www.commoncriteriaportal.org/files/epfiles/st_vid10390-st.pdf.

Security Exceptions—Retrieved Date: Jul. 14, 2011 http://msdn.microsoft.com/en-us/library/aa738641.aspx.

HP "Advanced Server for OpenVMS Concepts and Planning Guide"—Retrieved Date: Jul. 14, 2011 http://h71000.www7.hp.com/doc/82final/6553/6553pro_002.html.

Non-Final Office Action mailed Jan. 18, 2013 in U.S. Appl. No. 13/224,255, 21 pages.

Non-Final Office Action mailed Feb. 1, 2013 in U.S. Appl. No. 13/224,246, 26 pages.

Non-Final Office Action mailed Jun. 24, 2013 in U.S. Appl. No. 13/224,255, 25 pages.

Non-Final Office Action mailed Jul. 3, 2013 in U.S. Appl. No. 13/224,246, 38 pages.

Advisory Action mailed Sep. 20, 2013 in U.S. Appl. No. 13/224,255, 3 pages.

* cited by examiner

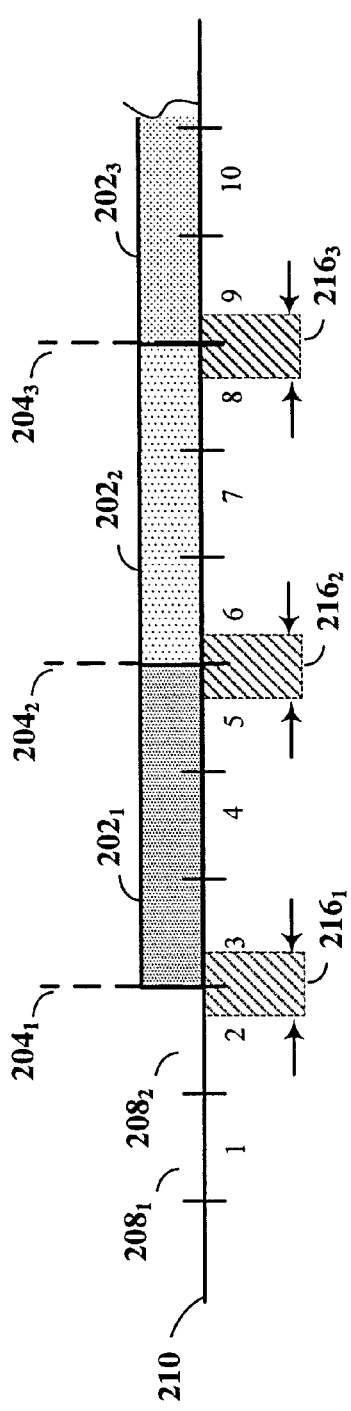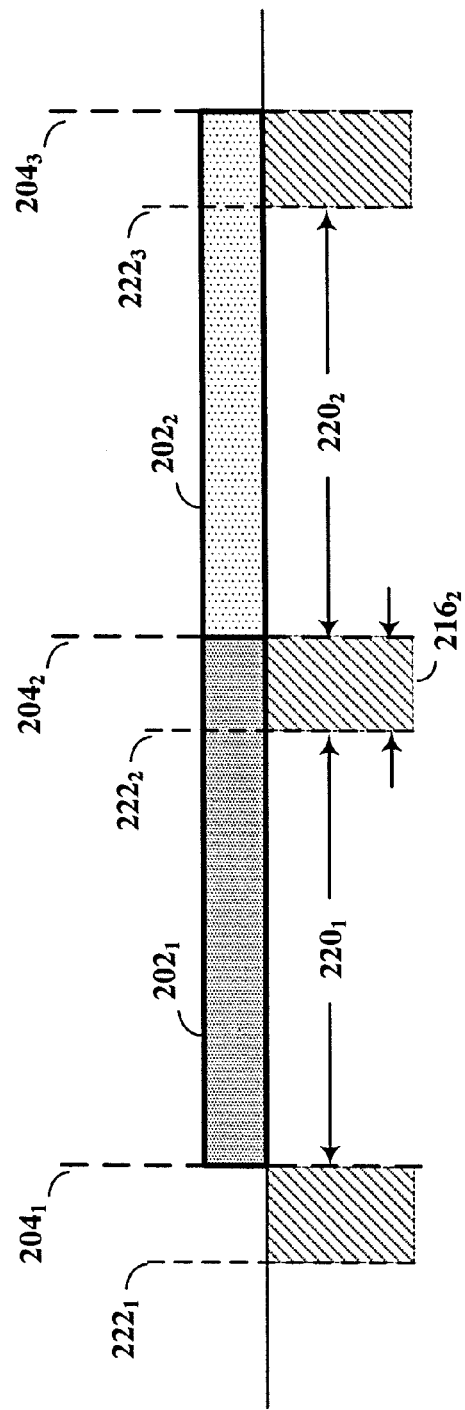
FIG. 2C
FIG. 2D

DISTRIBUTED COMPUTER SYSTEMS WITH TIME-DEPENDENT CREDENTIALS

BACKGROUND

Distributed computer systems have become an important solution to handle large amounts of data generated by modern computing demands. Spreading the computational workload over multiple separate computer systems not only offers the ability to process data faster than a single-computer system, but also provides scalability to add and remove computational resources as needed, as well as availability to provide service with fewer disruptions by avoiding a single point of failure. Such distributed systems can consist of up to thousands of interconnected computer systems, and are typically used by large enterprises to provide services such as web-hosting or secure intranets.

The distributed nature of such systems, however, makes security a challenge. Some security configurations may require that a computer responding to a request have access to a set of credentials for a particular service. However, in some distributed systems, a service may have multiple instances running on different computers, and one or more instances may attempt to operate under the same credentials. Further compounding the challenge, some distributed systems may route an incoming request for service to a randomly-chosen computer in the distributed system, so that different requests are spread out among different computers. Because the requestor does not distinguish among the many possible computers that might process a request for a service, any computer in the distributed system that may respond to a request for that service may have access to credentials associated with the service.

Credentials may allow a computing device to participate in any number of authentication functions associated with providing the service. For example, an authentication function may involve a service-providing computing device proving the service's identity to another device that requires its requestors to provide that service. Frequently, a computing device will prove the identity of a service by performing a cryptographic function using credentials of the service. For example, a request for authentication may arise when the device providing a service seeks to access information or other resources restricted to instances of that service. Alternatively, a request for authentication can arise in other contexts, such as when a client seeking to access a service attempts to verify that the device providing the service indeed represents that service. Regardless of the nature of the authentication function to be performed, for any one of a number of computing devices in a distributed system to seamlessly perform these authentication functions, one or more devices may take actions to run under a synchronized set of credentials. In this way, one or more computers involved in providing a service may present a common identity and may interchangeably participate in providing the service.

Furthermore, good security practices may dictate that these credentials be periodically updated to maintain their secrecy. This credential update may be referred to as a refresh, rollover, or regeneration of credentials. Regardless of the name, it is known to provide periodic updates of credentials by manually updating the credentials on computing devices that are authorized to have access to them. The process can be automated to a degree with scripts generating and setting the credentials, but mistakes are still common and may require human assistance. It is not uncommon for a large organization to spend significant amounts of money on personnel running these manual or partially automated operations. It is also not uncommon to experience disruptions in one or more services during such updates, especially when updates are coordinated among multiple instances of a service running in a distributed environment. Such disruptions may lead to monetary or personnel productivity loss for the organization.

SUMMARY

In a distributed system in which time-dependent credentials can be generated by any of multiple issuing devices, credential information is generated to include a first and a second credential. The first credential may be a credential computed for a current interval, as determined by a local time as tracked by the issuing device generating the credential information. The second credential may be a credential computed for a prior interval, as determined by a local time as tracked by the issuing device generating the credential information.

In addition to first and second credentials, the credential information may include an indication of whether the credential information was generated within a threshold amount of time of a transition between the prior and the current interval. Within this threshold of a credential transition, different ones of the credential-issuing devices may generate inconsistent credentials because of differences in local time as tracked by the issuing devices. Outside of this threshold, however, different ones of the issuing devices may generate consistent credentials, because their local times may either all be before or may all be after the credential transition. This threshold amount of time may be represented by a window of time around a transition or by any other suitable representation of an interval around a transition between credential information.

Devices having access to the credential information may selectively use the credentials based on whether the credentials were generated within a transition interval. In some embodiments, outside the transition interval, the first credential may be used. Within the transition interval, either the first or second credential may be used.

Furthermore, when a device generates information based on a credential, if that information is to be processed by a device that potentially has received credentials from an issuing device different than the issuing device used to generate the information, the second credential may be used. For processing received information that may have been generated using credentials potentially generated by an issuing device different than the one used to process the information, either the first or the second credential may be used to process the information.

In some embodiments, time-dependent credentials may be computed using a technique appropriate for a distributed system. Time-dependent credentials may be computed for an account, or any other entity for which credentials are generated, using two types of intervals. A first type of interval may define intervals that an issuing device may track using its own local clock. Such devices may identify intervals of the first type with a common set of identifiers and can select a key, for example, a cryptographic key, in use for each interval of the first type.

A second type of interval may relate to an account and indicate a period of time for which a credential for an account is valid. The intervals of the second type may be different for each account, but the issuing devices that generate credentials can determine, in terms of intervals of the first type, the duration of each interval of the second type for each account, such that intervals of a second type reveal a scheduled credential refresh time.

To generate a credential for an account, a device may determine a time, in terms of an interval of the first type, at which the credentials for the account are scheduled to change. This time, for example, may be the start of an interval of the second type. A device generating credentials may obtain a key, shared with other devices that generate credentials, that is valid for that interval of the first type. The key, in combination with information relating to the account and the time for which the credential is generated, may be combined in a cryptographic function to generate a credential. That credential may be valid for a current interval of the second type. To determine a credential for a prior interval, the interval of the first type marking the start of the prior interval of the second type may be identified, and the computation may be repeated for that interval.

In some embodiments, one or more techniques may be used to reduce excessive computational load throughout a distributed system that might otherwise occur if each of multiple devices were to compute new credentials for each account at a similarly scheduled rollover time. A device triggering re-generation of a credential may determine a scheduled rollover time, but the actual generation of credentials may occur at a time offset from the scheduled time by a random interval. In some embodiments, this random interval may be determined by the issuing device that generates the credential. In other embodiments, credentials may be requested from devices that use the credentials and such requests may be randomly distributed in time to avoid multiple requests arriving at the same time.

In one aspect, the invention relates to a system comprising a plurality of host computing devices and a plurality of controlling computing devices. The host computing devices host a plurality of services, and each of the controlling computing devices is configured to generate credential information for any service of the plurality of services. The credential information consists of a first credential, a second credential, and an indication. The first credential is determined for a first time interval of a plurality of time intervals based on a current local time of the controlling computing device. The second credential is determined for a second time interval of the plurality of time intervals, the second time interval preceding the first time interval. The indication indicates whether the local time of the controlling computing device is within a threshold amount of time of a transition between the first time interval and the second time interval.

In another aspect, the invention relates to a method of operating a computing device in a group of a plurality of computing devices that issue time-dependent credentials in a distributed system. Each computing device issues consistent credentials in a plurality of time intervals, the credentials being issued by each computing device in dependence on local time maintained locally on the computing device. The method consists of, with at least one processor, supplying credential information, which comprises a first credential, a second credential, and an indication. The first credential is determined for a first time interval of the plurality of time intervals based on the current local time of the computing device. The second credential is determined for a second time interval of the plurality of time intervals, the second time interval preceding the first time interval. The indication indicates whether the local time of the computing device is within a threshold amount of time of a transition between the first time interval and the second time interval.

In another aspect, the invention relates to at least one computer-readable storage medium comprising computer-executable instructions that, when executed, control a host computing device in a distributed system comprising a plurality of controlling computing devices that issue time-dependent credentials. Each of the plurality of controlling devices issues consistent credentials in a plurality of time intervals, the credentials being issued by each controlling device in dependence on local time maintained locally on the controlling device. The computing device uses credentials to perform an authentication function in accordance with a method. The method consists of receiving credential information from a controlling device of the plurality of controlling devices, wherein the credential information comprises a first credential, a second credential, and an indication. The first credential is determined for a first time interval of the plurality of time intervals based on the current local time of the controlling device. The second credential is determined for a second time interval of the plurality of time intervals, the second time interval preceding the first time interval. The indication indicates whether the local time of the controlling device is within a threshold amount of time of a transition between the first time interval and the second time interval. The method also consists of, based on the indication, selecting between the first credential and the second credential for use in performing the authentication function.

In another aspect, the invention relates to a networked system that consists of a plurality of computing devices, each having a respective local timing source, and each computing device being adapted to identify intervals of a plurality of intervals, the plurality of computing devices tracking intervals of a common duration using a respective local timing source. Furthermore, each computing device computes a credential for an entity by selecting an interval of the plurality of intervals based on credential rollover information associated with the entity, and executing a function of at least the selected interval and information associated with the entity.

In another aspect, the invention relates to a method of operating a computing device in a plurality of computing devices to generate time-dependent credentials for each of a plurality of accounts. The method consists of tracking time to identify a plurality of intervals and, with at least one processor, generating a credential for an account. This generation of a credential consists of determining for the account an interval of the plurality of intervals at which the credential for the account was most recently scheduled to change based on credential refresh information associated with the account, determining a key for the determined interval, and computing the credential as a function of at least the key and information associated with the account.

In another aspect, the invention relates to at least one computer-readable storage medium comprising computer-executable instructions that, when executed by at least one processor, perform a method of computing a credential for an entity. This method consists of accessing credential refresh information for the entity, where the credential refresh information consists of a starting time and credential rollover interval. Based on at least the starting time and the credential rollover interval, the method also consists of computing a scheduled time of credential rollover and computing the credential as a function of at least the computed scheduled time of credential rollover and information associated with the account.

In another aspect, the invention relates to a networked system that consists of a plurality of computing devices, each computing device being adapted to generate consistent credentials for each of a plurality of entities, where the credential generated for each entity is different during each of a plurality of first-type intervals applicable to the entity. Each computing device generates the credentials by tracking a plurality of second-type intervals of a common duration and computing a credential for an entity. The computation of a credential for an entity consists of selecting a second-type interval of the plurality of second-type intervals based on credential rollover information associated with the entity, the selected second-type interval defining a start of a first-type interval, and executing, at a time that is offset from a reference time defined by the selected second-type interval, a cryptographic function to generate the credential for the entity that is valid during the first-type interval.

In another aspect, the invention relates to a method of operating a distributed computer system to provide time-dependent credentials. This method consists of, for each of one or more entities, with at least one processor, repeatedly generating credentials, where each credential is valid for a first-type interval determined relative to a subset of a plurality of second-type intervals. The generation of credentials consists of determining, for each of the one or more entities, a time to re-generate the credential for a second first-type interval, where the time is determined relative to an end of a first first-type interval and is offset from the end of the first first-type interval by a random time.

In another aspect, the invention relates to at least one computer-readable storage medium that consists of computer executable instructions that, when executed by a computing device in a distributed computing system with a plurality of controllers, perform a method. This method consists of receiving credential information, the credential information comprising at least one credential and a time indication value indicating a projected time at which an updated credential can be obtained from any of the plurality controllers. Furthermore, the method includes requesting an updated credential at a random time determined relative to the projected time.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2C is a sketch illustrating symmetric transition intervals around scheduled renewal times for a credential in which computing devices may issue inconsistent credentials because of clock skew;

FIG. 2D is a sketch illustrating asymmetric transition intervals, as well as other time intervals used by a computing device to issue time-dependent credential information to avoid effects of inconsistencies in a distributed system;

DETAILED DESCRIPTION

Figure 1A:
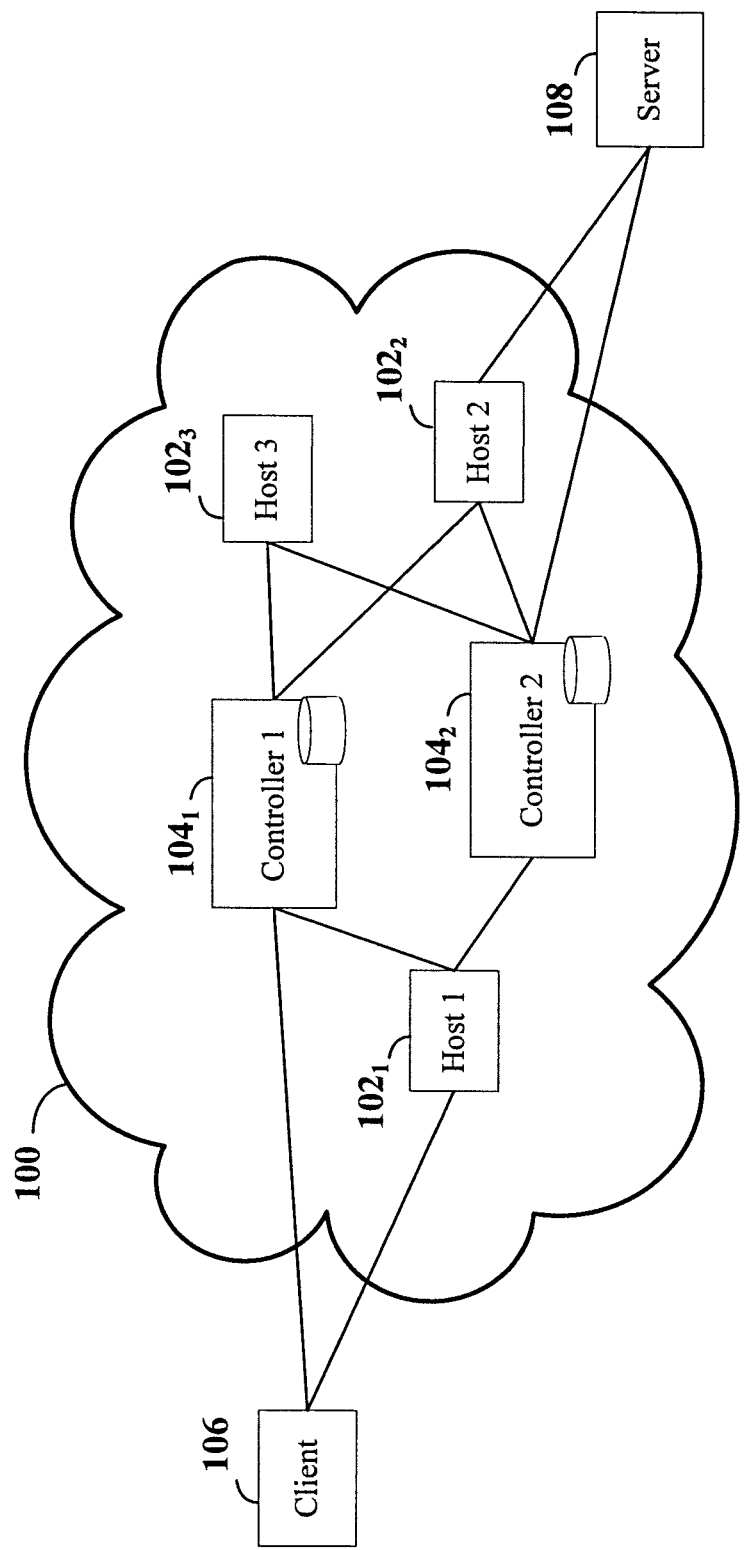
FIG. 1A is a schematic illustration of a distributed system in which embodiments of the invention may operate.

The inventors have recognized and appreciated that improved techniques for supplying and/or using credential information may reduce the risk of errors or disruptions that can arise in a distributed system in which devices, such as hosts for services, acquire credentials from any of multiple issuing devices, such as domain controllers. In some systems, controllers may provide time-dependent credentials, such that the hosts and/or the controllers can successfully perform authentication functions despite inconsistencies that can arise from timing skew among the controllers that result in different ones of the controllers generating different credentials applicable at the same time in an absolute time frame.

In some embodiments, each service, or other entity that is to use credentials, may have an account replicated on the controllers. Information associated with the account may reveal a validity interval associated with credentials, such that the credentials for each account may be changed upon passage of a validity interval. In a distributed system in which each of the controllers maintains its own local time, different controllers can change the credentials at different times. As a result, an authentication function performed in part using credentials on one controller might fail when another part of the authentication function is performed on a different controller using inconsistent credentials.

In some embodiments of a distributed system, each controller may have a mechanism to identify an interval and a mechanism to generate credentials for the interval. For example, each controller may divide time into intervals, and a different credential for a service may be assigned to each interval. Each of multiple controllers may attempt to generate consistent credentials for the service by performing a computation that depends on the interval during which the credentials are generated. However, each of the controllers may track its own local time such that a difference, or skew, between the local times tracked by different ones of the controllers may result in different ones of the controllers, at the same absolute time, assigning a different interval to that time and accordingly generating different credentials. In this scenario, there is a possibility that a first controller will identify an applicable time interval, as measured by the local time of the first controller, but a second controller that has a different local time may determine that a different interval is applicable, based on the local time of the second controller.

If the first controller and the second controller determine that different time intervals are applicable, then the first controller and the second controller may supply different credentials at the same absolute time instance. As a result, an authentication function initiated based on credentials from one of the controllers may not yield the expected result if completed based on a credential from the other controller. For example, if a token is generated for a service based on a credential from a first controller and then supplied to a device that attempts to validate the service based on the token and a credential from the second controller, the result of the validation function may be a conclusion that the credential is not valid. Such a conclusion, resulting from the first controller and the second controller supplying different credentials at the same time, may lead to a failure to authenticate and result in service disruptions.

The inventors have recognized and appreciated that such disruptive results may be avoided through controlling one or more of the devices in the system to take actions that yield consistent results during a window of time around transitions between intervals in which a different credential is valid. To support such actions, when controllers generate credential information, each may make available a first credential and a second credential. The first credential may represent a credential as applicable in the current interval, as measured by the local time on the controller generating the credential. The second credential may represent a credential as applicable in the immediately preceding interval, as measured by the local time on the controller generating the credential. In addition, the credential information may include an indication of whether the credential information was generated in a window of time around a transition, or a transition interval, during which different ones of the distributed controllers might, based on their local time references, conclude that they are operating in different time intervals.

Devices having access to this credential information may use the indication to select which of the credentials to use. The credential selected additionally may depend on the nature of the authentication function to be performed with the credential. For example, in a scenario in which the indication information indicates that the credentials were not generated in a transition interval, a device may select the credential representing the credential applicable to the current interval, as determined by the controller generating the credential information. This credential may be selected regardless of the nature of the authentication function to be performed.

However, if the credentials were generated during a transition interval, then a device may select a credential based on the nature of the authentication function to be performed. If, for example, the authentication function is an outbound function, such as a function intended to generate a token by performing a cryptographic function using the credential, then the second credential may be selected during the transition interval. This selection may ensure that a device receiving the token can validate the token with any controller, even ones that have not yet transitioned to the new interval. Conversely, if the function is an inbound function, such as a function involving an attempt to validate a token provided by another device, then either the first credential or the second credential may be accepted as validating the token. Accordingly, selecting between the first and second credential based on which validates the token may avoid an incorrect result if the token was generated with credentials from a controller that had not yet transitioned to the new interval.

Turning now to FIG. 1A, an exemplary system in which authentication functions may be performed is illustrated. In this example, the system is a distributed system containing devices that generate credentials and other devices that use those credentials. These devices are connected by a network such that they may exchange credential information and perform other functions in accordance with their roles in the distributed system. It should be appreciated that, though devices generating credentials and those using credentials are illustrated as having specific, and different, roles within the distributed system, such a distinction is not a requirement of the invention. The role of a device that generates or uses credentials is not critical to the invention. In some embodiments, for example, devices that generate credentials may use them.

FIG. 1A is a simplified illustration of a distributed system 100 consisting of one or more interconnected computing devices. Here, four types of devices are shown: hosts, controllers, clients, and servers. The number and type of devices, however, are merely for illustrative purposes and are not critical to the invention.

Hosts, such as hosts $102_1$, $102_2$, and $102_3$, are illustrated. Hosts may be computing devices that, among other functions, provide one or more services to other computing devices. For example, a host may be a server in an enterprise network, a database, or may be any other device that provides data and/or services to other computing devices.

FIG. 1A also illustrates multiple controller devices in system 100. For simplicity, two controllers, controller $104_1$ and controller $104_2$, are illustrated. The controllers may perform various functions, including but not limited to, controlling which devices have access to the network or controlling one or more actions on other computing devices. As a specific example, the controller devices may be domain controllers, such as are known in the art for enterprise networks. Each of these controller devices may be programmed to issue time-dependent credentials for one or more entities for use by itself or by other computing devices. Such credentials may be used, among other reasons, for authenticating an entity, which may be, for example, a user, an account, or a service. In the example of FIG. 1A, the entities for which credentials are issued may correspond to accounts used to control access to the managed network interconnecting the devices forming the distributed system. Each service executing on a host may execute under such an account such that each service may have an identity recognized within the distributed system and for which credentials may be issued.

Other devices, either within or external to the distributed system, may exchange data or services with hosts and/or controllers. For example, such a device may be a client 106 or a server 108, or any other device that requests services from or provides services to devices within the distributed system 100. In the example illustrated in FIG. 1A, client 106 may obtain an authorization token from controller $104_1$ in order to establish a secure connection with host $102_1$. Conversely, a server 108 may use controller $104_2$ in order to validate tokens it receives from host $102_2$.

In some embodiments of distributed system 100, one or more devices, such as hosts or controllers, may replicate data and services. Replicated devices may indicate that any one of a plurality of devices are able to perform a function. In such a scenario, although different devices may have different instances of data or a service, the goal of replication may be to allow one or more instances to provide consistent results to any given request at any given time.

A possible motivation for a replicated system, among other reasons, may be to allow a request for a service to be routed to any device among a plurality of devices that provide the same data and/or service to distribute processing load over multiple devices. The requestor will not necessarily know which particular device performs the service. Therefore, the requestor may not direct the request to a specific one of the devices in the distributed system. In such an exemplary scenario, one or more devices in the set of devices may execute service under the same identity and may take actions to have access to consistent credentials.

As an example of such a replicated system, in FIG. 1A, a database service may run on hosts $102_1$, $102_2$, and $102_3$ such that one or more instances of the database on the hosts may take actions to execute under the same security principal at any point in time. In such an embodiment of a replicated system, one or more controllers $104_1$ and/or $104_2$ may execute a distributed credential generation service to attempt to generate consistent credentials at any point in time.

The task of generating consistent credentials, however, may be a challenge in some distributed systems. For example, in some embodiments, called multi-master systems, the controllers may act as peers and each may generate its own credentials independently, according to its own local clock and internal state. However, it should be appreciated that the present invention is not necessarily limited to multi-master configurations. Alternatively, there may be a single (master) controller which generates and distributes credentials to other (slave) controllers. Regardless of how controllers coordinate credential generation, there may be a challenge of reconciling possibly inconsistent credentials generated by different controllers and used by different hosts. Inconsistencies may arise, for example, due to differences in local time references between controllers, or delays in transmission, or other factors that may result in differences in local times as tracked by different controllers. In some embodiments, inconsistencies may be intentionally introduced into the system by spreading out over time the computational load of generating credentials.

Figure 1B:
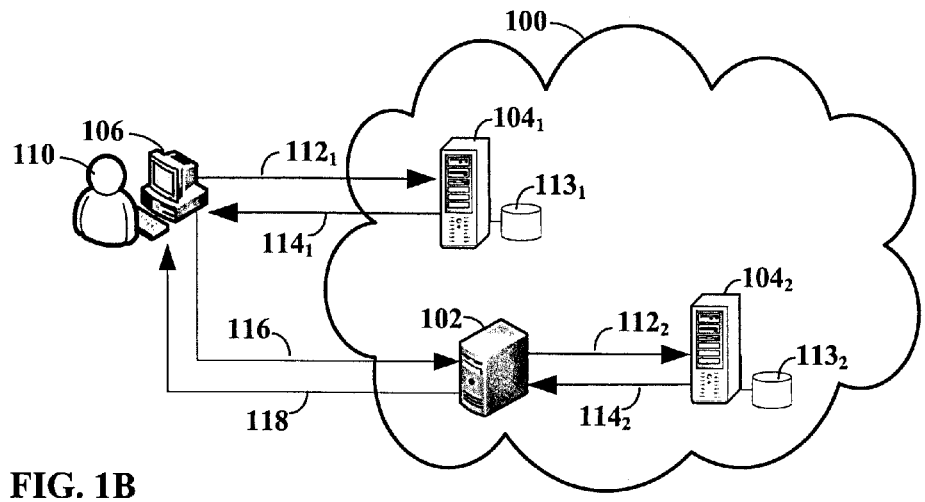
FIG. 1B is a sketch illustrating a flow of credential information within a distributed system during an authentication function.
Figure 1C:
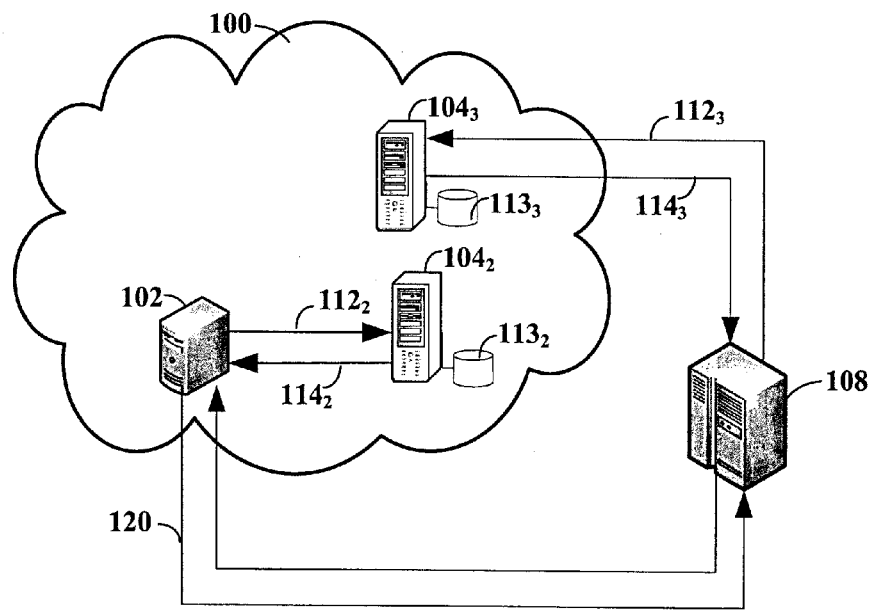
FIG. 1C is a sketch illustrating a flow of credential information within a distributed system during an alternative authentication function.

FIG. 1B and FIG. 1C present examples of how inconsistent credential information between controllers may lead to authentication failures. It should be appreciated, however, that these two examples are merely representative embodiments, and are in no way limiting. Inconsistencies may arise in any of a number of ways, and techniques as described herein may be applied to avoid service disruptions in these and other types of systems.

FIG. 1B shows a scenario of two different devices, acting as controllers $104_1$ and $104_2$, participating in an authentication function. Each of these devices may be any suitable device that generates credential information. In some embodiments, controllers $104_1$ and $104_2$ may be Domain Controllers. Alternatively or additionally, they may be Kerberos Key Distribution Centers. It should be appreciated, however, that distributed system 100 is not necessarily limited to these choices, and may be implemented by any suitable configuration of interconnected computing devices exchanging information according to authentication methods.

In the example of FIG. 1B, a first controller $104_1$ receives a request $112_1$ for an authentication function involving credentials. This request may have been randomly routed from a computing device 106, which may be a client acting on behalf of user 110, or may be any other device requesting an authentication function. In addition, this client may be requesting an authentication function for a particular entity, such as an account. The purpose of this authentication function may be to gain authorization for a secure transaction with a computing device, such as device 102, which may be a host or any other device providing service. For example, the request $112_1$ may be a request for controller $104_1$ to use credential information to generate a ticket that the client 106 may use to access another service at host 102.

Alternatively, the request $112_1$ may have been received by controller $104_1$ by any other suitable means, such as deterministic routing, and with any other suitable purpose, such as authorizing an inbound request. In general, however, the request that a controller receives from a device may be any suitable request for an authentication function involving credentials.

Upon receiving request $112_1$, controller $104_1$ may determine the credentials for the requested entity by using a number of means, including but not limited to, retrieving credential information from its local data store $113_1$ or computing a credential generating function. In some embodiments, this credential generating function may be time-dependent, and may depend on the local time as tracked by controller $104_1$. Regardless of how the controller determines this credential information, it may return a suitable response $114_1$ back to the client 106. As an exemplary scenario, if the system utilizes Kerberos-based authentication, response $114_1$ may be a cryptographic function of the credential information containing an authentication token and an encryption key.

Upon receiving response $114_1$, in some embodiments, the client 106 may then use the received information in a subsequent authentication function that includes a request 116 routed to host 102, which may be a device that provides a service. In this embodiment, the authentication function may include authentication of device 106, but in other embodiments, the authentication function may involve any suitable cryptographic function of the credentials.

Upon receiving request 116, host 102 may then attempt to authenticate the request by sending a subsequent request $112_2$ for an authentication function to a second controller $104_2$. For example, the nature of this authentication function may be, but is not limited to, the host 102 accessing credential information to authenticate request 116. The second controller may attempt to perform this authentication function by determining credential information for the same account that was associated with request $112_1$. Controller $104_2$ may make this determination, for example, by reading from its local store $113_2$ or computing a credential generating function.

Regardless of how controller $104_2$ determines the credential information, it may use this credential information to attempt an authentication function and return a result $114_2$ to the host 102. The host 102 may then return a reply 118 to client 106, either granting or denying the authentication request, or any other suitable response.

In some embodiments, in order for the client 106 to receive service from the host 102, it may be required that the second controller $104_2$ use credential information that is consistent with credential information used by the first controller $104_1$. However, differences in internal states in the first controller $104_1$ and in the second controller $104_2$ may cause different controllers to have inconsistent credential information, which may result in a failure to authenticate. For example, this may occur if the credentials are time-dependent and depend on different local times on the first controller $104_1$ and the second controller $104_2$.

The preceding example illustrated in FIG. 1B describes an example in which a host 102 may participate in an "inbound" authentication function, or more generally, in any suitable function that involves applying a credential to an object received from another device. The object may be deemed authorized if the device performing the authentication function determines that the object was generated by a device using the same credentials as applied by the device performing the authentication function. Authentication failures may arise when the host 102 and the client 106 obtain inconsistent credential information for the same account from two different controllers. In this case, for example, controllers $104_1$ and $104_2$ may generate time-dependent credentials using local time references that are significantly different.

As another example of how inconsistent credential information may cause authentication failure, FIG. 1C illustrates a scenario of host 102 subsequently sending a request 120 to another device 108. This may be a request to access a service, such as data or applications, on device 108, which may itself be a server or database or any other device that provides a service. This scenario may occur, for example, if the request 120 from host 102 involves an "outbound" authentication function to device 108.

The host 102 may send a request $112_2$ for an authentication function to controller $104_2$, with the purpose of gaining authorization for a secure transaction with a device 108. The controller $104_2$ may perform the authentication function either by using credentials from its local store $113_2$ or by computing a credential generating function, and subsequently return an appropriate response $114_2$ to the host 102. Analogous to the "inbound" case of FIG. 1B, this response $114_2$ may consist of an object that was encrypted using credentials, which the host 102 may send in a request 120 to device 108, which may then attempt to acquire authentication for that object.

In order to authenticate the received object, server 108 may send a request $112_3$ for an authentication function to a third controller, $104_3$. As with controllers $104_1$ and $104_2$, this third controller $104_3$ may determine credential information using a number of means, such as reading from its local store $113_3$ or computing a credential generating function. This credential generation process may be time-dependent such that the credentials may depend on the local time as tracked by the controller $104_3$ generating the credentials. Based on the results of this authentication function, the controller $104_3$ may then return a response $114_3$ to device 108. Authentication failures may arise when controllers $104_2$ and $104_3$ use inconsistent credentials to perform their respective authentication functions.

Both FIG. 1B and FIG. 1C show examples of how inconsistencies in credential information may lead to undesired authentication failures. Such inconsistencies in credential information may be caused by various factors. One possible reason for credential inconsistencies may be that, in some distributed systems, credentials may periodically change, the purpose of which may be, among other reasons, to help maintain their secrecy. However, different credentials may be in used by different parts of the system at the same time, creating inconsistencies that can lead to unintended authorization failures, even between devices that received valid credentials.

Figure 2A:
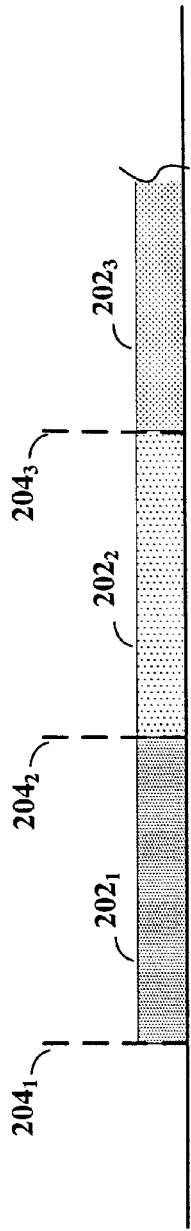
FIG. 2A is a sketch of a timeline illustrating issuance of time-dependent credentials on a single computing device.

FIG. 2A illustrates a timeline diagram of an exemplary controller 104 with time-dependent credentials. In some embodiments, a particular credential may be valid for only a certain length of time, and may change after that time has expired. FIG. 2A illustrates three intervals, $202_1$, $202_2$, and $202_3$, which may be referred to as validity intervals or rollover intervals, during which particular credentials may be valid. The number and name of such intervals, however, is not critical to the invention. The length of such intervals may be any suitable duration, but may be several days or several weeks, depending on the application or service that is being secured. For example, more secure services may have more frequent credential renewals and shorter validity intervals. Moreover, the intervals of this type used for different entities may be of different durations and may start at different times.

In some embodiments, each validity interval, $202_1$, $202_2$, $202_3$, may be preceded and/or followed by a time at which credentials are changed, illustrated in FIG. 2A by transition times $204_1$, $204_2$, and $204_3$. These transition times, the number and name of which are not critical to the invention, may represent times at which there is a change from older credential information to newer credential information, or may represent any other suitable change in credential information.

In some embodiments of a distributed system, these validity intervals and transition times may be determined by a controller using refresh information associated with an account or other entity for which a credential is generated. In some embodiments, this refresh information may consist of a time between scheduled changes in credential information. Alternatively, in some embodiments, the refresh information may also include the time of creation of an account or other entity, or any other suitable starting time for measuring these validity intervals.

In some embodiments, such as replicated systems, different controllers may try to perform credential updates in a synchronous manner, so that consistent credentials are maintained throughout the distributed system. However, synchronous credential updates may be a challenge if there are differences in local times as tracked by different controllers. In such a scenario, at any given time, some controllers may have older credentials while other controllers have newer credentials.

Figure 2B:
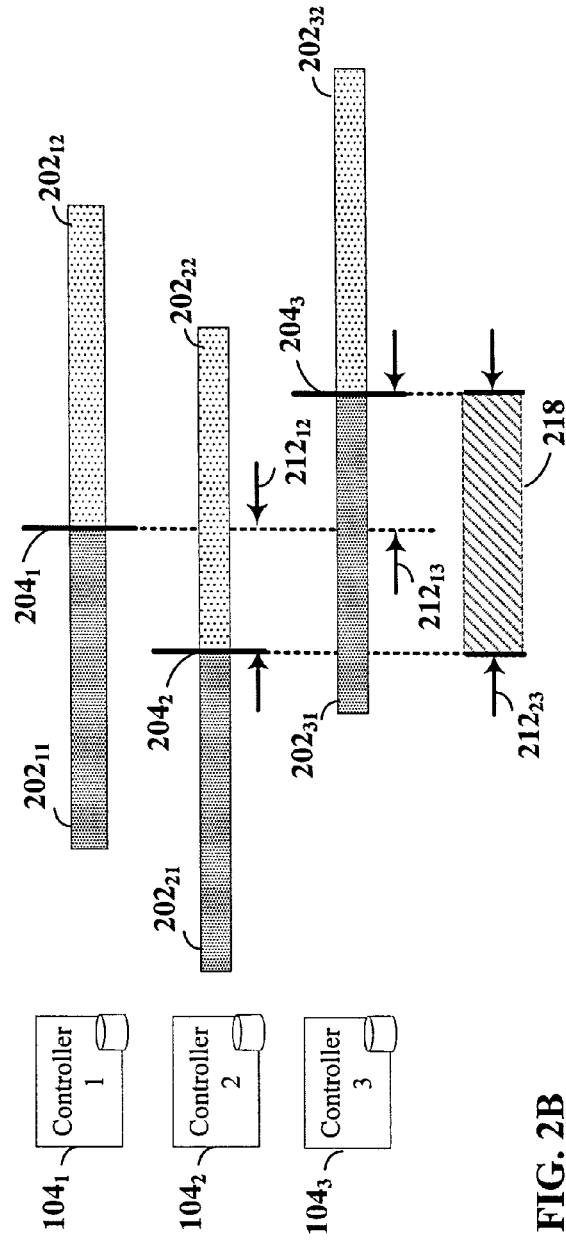
FIG. 2B is a sketch illustrating a transition interval in which multiple computing devices, each issuing time-dependent credentials, may issue inconsistent credentials because of clock skew.

FIG. 2B illustrates one possible example of how differences in local times may cause inconsistencies in credential information. In this example, three controllers, $104_1$, $104_2$, and $104_3$, are shown, although the exact number is not critical to the invention. The controllers may determine scheduled times for credential rollover that are intended, relative to an absolute time scale, to occur at the same time. However, none of the controllers is operating relative to an absolute time scale, but rather, each is operating according to its own local time. Although the distributed system may attempt to synchronize the local times of the controllers, for various reasons there may exist differences between the local times tracked by each of the controllers.

As a result, the controllers may experience credential transitions at different times, which are denoted by times $204_1$, $204_2$, and $204_3$. These times may represent possible transitions from one rollover interval to another rollover interval. As illustrated, the first and second rollover intervals for the first controller are labeled as intervals $202_{11}$ and $202_{12}$, for the second controller as intervals $202_{21}$ and $202_{22}$, and for the third controller as intervals $202_{31}$ and $202_{32}$, respectively.

The differences, or skews, between local clocks may be represented by differences in transition times at different controllers for the same scheduled transition. As illustrated, the difference in transition times between the first controller $104_1$ and second controller $104_2$ is denoted by time skew $212_{12}$; between the first controller $104_1$ and third controller $104_3$ denoted by time skew $212_{13}$; and between the second controller $104_2$ and third controller $104_3$ denoted by time skew $212_{23}$. At time $204_1$, when the first controller $104_1$ may just begin to transition from one credential to the next credential, the second controller $104_2$ may already have transitioned to the next credential, while the third controller $104_3$ may still be using the previous credential.

As illustrated, in some embodiments, there may exist an interval of time around a scheduled transition during which a request for credentials, if processed by different controllers, may return different results. Such inconsistencies may lead to an unintended authorization failure. It should be noted, however, that FIG. 2B represents just one possible embodiment of how inconsistent credentials may exist at different controllers.

FIG. 2C illustrates how, in some embodiments, a controller may utilize differential processing of credentials near a vicinity of transition times to avoid unintended authorization failures. In some embodiments, a controller may divide its timeline 210 into discrete units of another type of interval. This type of interval, which may be referred to as "epochs," may be of fixed duration, which may be shorter than the validity intervals, although the exact name and duration is not critical to this invention. For simplicity, in FIG. 2C, only the first two epochs are labeled, labeled as $208_1$ and $208_2$.

Each controller may track time in terms of these epochs. The tracking of epochs may be generally synchronized, in any suitable way, across all the controllers. Accordingly, there will be corresponding epochs across all of the controllers. However, because each controller uses its own local time to determine the start and stop of each epoch, the epochs will be subject to skews that are similar to the skews illustrated in FIG. 2B.

Each controller may measure time relative to these epochs. For example, each validity interval may start and stop at a time aligned with the beginning of an epoch. In some embodiments, transition times may correspond to beginning of epochs. As illustrated, transition times $204_1$, $204_2$, and $204_3$ correspond to the beginning of epochs 3, 6, and 9. In some embodiments, a validity interval may be expressed as an integer number of epochs. In this example, each validity interval consists of three epochs, but the actual number of epochs per validity interval is not critical to the invention.

In some embodiments, around each transition time of a credential, the controller may designate a certain window of time, or a transition interval. Three such transition intervals are shown in FIG. 2C, labeled $216_1$, $216_2$, and $216_3$, although the actual number of such transition intervals may depend on the number of corresponding transitions. A transition interval may be defined in a number of ways. As an example, a transition interval may be determined by all times that are less than a threshold amount of time from a scheduled transition between credential validity intervals.

The threshold may be set to ensure that, regardless of any clock skew that may exist across controllers, by the threshold amount of time before the scheduled transition time on any of the controllers, none of the other controllers will have experienced a corresponding transition to new credentials. Likewise, by the threshold amount of time after the scheduled transition time on any of the controllers, all of the other controllers will have experienced a corresponding transition to new credentials.

In some embodiments, the threshold may be defined based on an estimate of the maximum skew between any two controllers. For example, FIG. 2B illustrates a maximum clock skew 218 which, in FIG. 2B, corresponds to the skew between controllers $104_1$ and $104_3$. Determining the maximum clock skew 218 may be done in a number of ways, including but not limited to, controllers periodically polling an authoritative time source, and taking the difference between the time of the first controller poll and the time of the last controller poll. Regardless of how the maximum skew 218 is estimated, it may be used to designate a threshold amount of time around a transition time.

The threshold may be determined in a number of manners, such that it may designate a transition interval large enough so that outside of the transition interval, no unintended authorization failures occur if any device assumes that all controllers have the same credentials. More generally, the threshold may be used in any appropriate way to designate a transition interval such that devices may generate and/or use credentials differentially inside and outside of the transition interval.

In some embodiments, the duration of the transition interval may depend on the way credentials are used. In embodiments in which a device uses credentials differently before a scheduled transition than after, the transition interval may extend for different amounts of time before and after a scheduled transition. Accordingly, it is not a requirement that the transition interval be symmetrical to avoid unintended failures of authentication.

For example, a first device, upon a failure of an authentication function involving an object generated by a second device, may repeat the authentication function using the immediately prior credential. If the second device had not yet transitioned and generated the object with the prior credential, the authentication will succeed. Similarly, if any device that has just transitioned to a new credential continues to use the immediately prior credential until the end of its transition interval, any other device—whether or not the device has transitioned to the new credential—will be able to successfully complete authentication functions. With this protocol for using credentials, each controller may only need to track the transition interval following a scheduled transition. In other words, in this embodiment, the transition interval may extend only to times after a scheduled transition time, but not before.

Regardless of the length and symmetry of the transition interval, inside of this transition interval, controllers may not have consistent credential information. For example, some controllers may have old credentials while others may have new credentials, or there may be other forms of discrepancy between credential information.

Therefore, in some embodiments, it is within these particular transition intervals that computing devices may selectively use time-dependent credential information in such a way as to ensure that other devices may be able to successfully perform authentication functions, despite possible inconsistencies in the credential information.

In some embodiments, the duration of a transition interval may be smaller than the duration of an epoch, as illustrated in FIG. 2C. For example, the length of a transition interval may be several minutes or seconds, while the length of an epoch may be several hours or days. It should be appreciated, however, that the exact duration of epochs and thresholds is not critical to the invention, and either may take on any appropriate value depending on the nature of the distributed system.

While the exact nature of credential information may depend on the security protocol utilized, in some embodiments, the credential information may consist of three types of information: a first credential, corresponding to a first validity interval; a second credential, corresponding to a second validity interval preceding the first validity interval; and an indication of whether the local time of the computing device that issued the credentials is within a threshold amount of time of transition between the first and second intervals. This later type of information may be an example of information that indicates that the first credential was generated, or possibly supplied, during a transition interval.

Determining the first and second validity intervals that are used to compute the first and second credentials may depend on the time of the credential generation. In some embodiments, the first interval may be the current interval (the interval that includes time of credential generation). Alternatively, in some embodiments the first interval may be the next interval (the interval after the one that includes the time of credential generation).

In some embodiments, the indication of whether the local time of computing device that issued the credential is within a threshold amount of time of a transition between the first and second validity intervals may consist of one or more time indication values, or timing values. In some embodiments, there may be a first time indication value and a second time indication value. The number of such values, however, may differ depending on the nature of the authentication configuration used.

For example, the first time indication value may represent a projected time at which an updated credential can be obtained from any of a number of computing devices. For simplicity, this first time indication value may be referred to as a "come-back" hint (or CB for short). In some embodiments, the second time indication value may represent a projected time before which none of the controllers will supply an updated credential. For simplicity, this second time indication value may be referred to as a "no-change" hint (or NC for short). These values may be determined in any suitable way.

FIG. 2D and Tables 1 and 2 show possible embodiments of how a computing device may issue time-dependent credential information. In these particular embodiments, the transition intervals are asymmetrically positioned to precede transition times, but in general the transition intervals may have any type of symmetry with respect to transition times.

Table 1 represents an embodiment in which a computing device may generate new or replace stale credential information. This scenario may occur, for example, if the credentials have not been accessed in a sufficiently long time. Such a determination may be based on various criteria, for example one criteria may be that the credential information in store corresponds to intervals prior to interval $202_1$ in FIG. 2D. Irrespective of the specific criteria or motivation, a computing device may at any point decide to generate new credential information according to Table 1.

Table 2 represents a scenario in which a computing device may return the existing stored credential information, or may also possibly generate new credentials. This scenario may occur, for example, if the stored credential information exists and is deemed as being current, according to any number of suitable criteria, such as part of the credential information corresponding to interval $202_1$ in FIG. 2D. Regardless of the specific criteria or motivation, a computing device may at any time decide to return credential information based on Table 2.

TABLE 1

Generating new or replacing stale credential information.

| Interval | Validity interval used to compute credential | First time indication value (come-back hint) | Second time indication value (no-change hint) | Write? |
|---|---|---|---|---|
| $220_1$ | $202_1$ | $204_2$ | $222_2$ | Yes |
| $216_2$ | $202_1$ | $204_2$ | Current time | Yes |
| $220_2$ | $202_2$ | $204_3$ | $222_3$ | Yes |

TABLE 2

Replacing existing current credential information.

| Interval | Validity interval used to compute credential | First time indication value (come-back hint) | Second time indication value (no-change hint) | Write? |
|---|---|---|---|---|
| $220_1$ | $202_1$ | $204_2$ | $222_2$ | Yes |
| $216_2$ | $202_2$ | $204_2$ | $222_3$ | No |
| $220_2$ | $202_2$ | $204_3$ | $222_3$ | Yes |

In both Tables 1 and 2, the first column shows three possible intervals, $220_1$, $216_2$, and $220_2$ as illustrated in FIG. 2D, which represent three disjoint intervals of time during which credential generations may occur. The number and nature of such intervals, however, is chosen for illustrative purposes and is not critical to the invention. The first row of Tables 1 and 2 corresponds to an interval $220_1$ before a transition interval. The second row corresponds to a interval $216_2$, which is a transition interval. The third row corresponds to an interval $220_2$ after a transition interval.

The second column of Tables 1 and 2 shows the validity interval used by the computing device to compute the credential information. The third and fourth columns show different assignments for the two time indication values. Although in this example a time indication value is a nominal time, alternatively a time indication value may an interval of time starting from the current time, or any other indication of a time instance. The last column of Tables 1 and 2 denotes whether the credential information generated by the computing device may be stored locally and replicated out to other computing devices.

Figure 3:
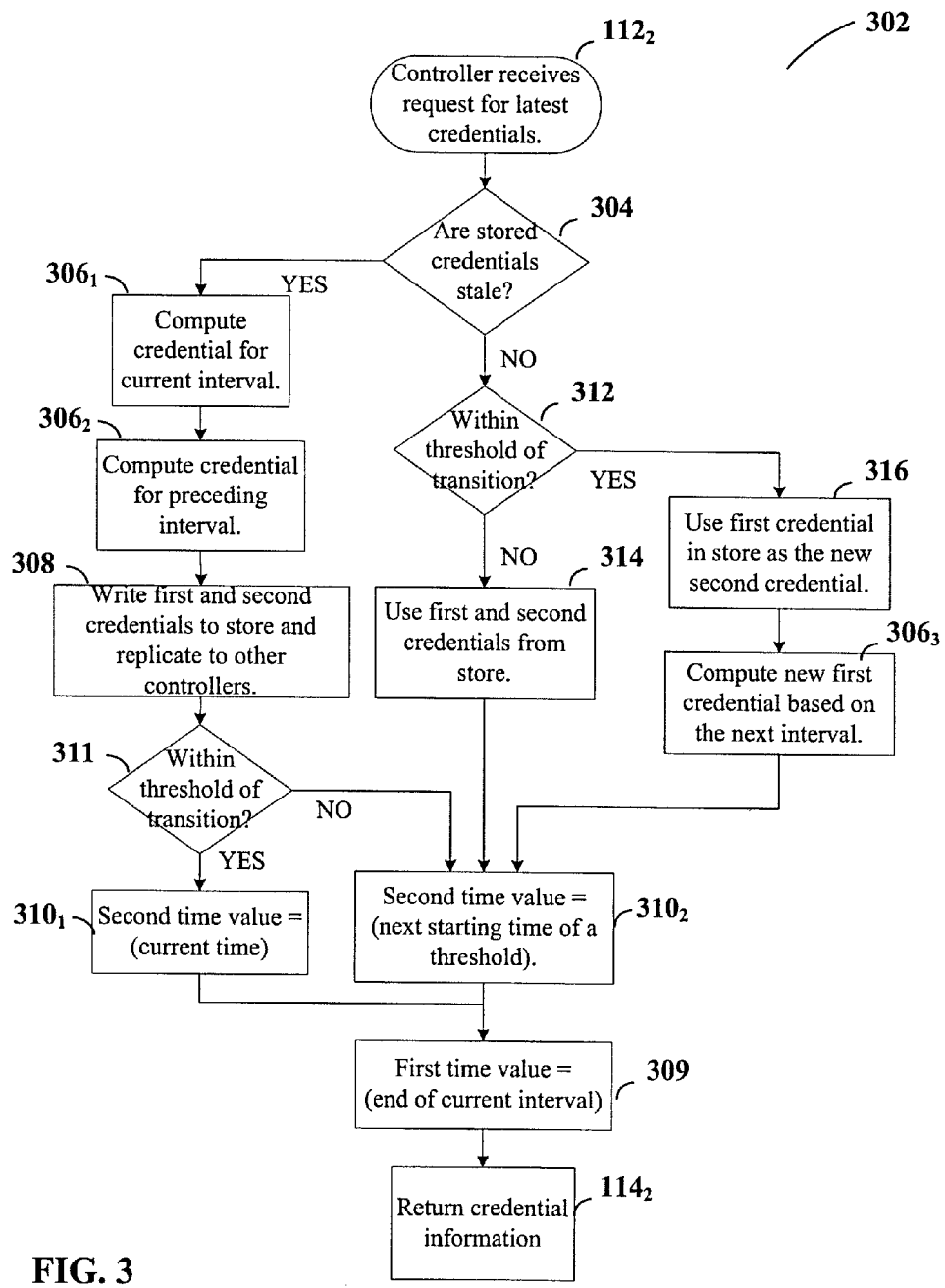
FIG. 3 is a flow chart of a method of operation of a computing device to issue time-dependent credential information to avoid effects of inconsistencies in a distributed system.

FIG. 3 illustrates one possible embodiment of a method 302 of operating a computing device that may use Tables 1 and 2 to issue time-dependent credential information. The computing device may be a controller that generates credential information in response to a request for credentials, $112_2$, which may have been sent by a host or in general by any device requesting credentials. Alternatively, method 302 may be used to generate credentials for other authentication requests, such as requests to validate credentials, or requests to use credentials, or any other suitable authentication function involving credentials.

Moreover, it is not a requirement that the request be received over a network or from another device. The request may be received, for example, at a component that generates credentials from another component on the same device that will use the credentials or that manages credentials. As a specific example, in some embodiments, the request may be generated by a component that tracks scheduled rollover times for credentials of multiple entities and requests new credentials.

In FIG. 3, a computing device, such as a controller, that issues credential information may first determine in 304 whether the credentials in its local store are stale. Such a determination may be made, for example, by checking if the stored first credential does not correspond to the current validity interval. If the credentials in store are determined to be stale, then the controller may compute the first and second credentials, as in acts $306_1$ and $306_2$, corresponding to the current validity interval and the preceding validity interval, respectively. The scenario of stale credentials corresponds to Table 1, in which the current validity interval is either interval $202_1$ or interval $202_2$, depending on when the request for credential arrived, as determined by the first column of the table.

Alternatively, the credentials may be deemed to be "a bit" stale, for example if the first stored credential corresponds to the interval prior to the current interval. In this case, the credentials may be updated by assigning the stored first credential to be the new stored second credential, and computing a new first credential to store based on the current validity interval. In this way, fewer computations may be used as compared to the case of when both stored credentials are stale.

In FIG. 3, the controller may then proceed, in act 308, to write these newly-computed credentials to its local store and send replication updates to other controllers, corresponding to the last column of Table 1. This act may be performed in a distributed system in which controllers replicate information as part of managing a distributed system in which all controllers in the distributed system can perform functions consistently. However, in other embodiments, such replication updates may be done selectively or may be omitted entirely. Such replication updates, when they are performed, for example, may involve sending the newly-computed credentials to other controllers, so that they may write those credentials to their local stores.

Subsequently, in act 311, the controller determines whether it is within a transition interval. If so, then it sets the second time indication value (the NC hint) to represent the current time, as in act $310_1$. In Table 1, this corresponds to a request arriving in interval $216_2$. This time indication value indicates to the requestor that the credential may change at any time in the near future because the controller is within the transition interval and therefore other devices may update their credentials during this transition interval. Otherwise, if the controller determines that it is not within a threshold interval, then in act $310_2$ the controller sets the second time value to represent the starting time of the next threshold. In Table 1, this corresponds to the request arriving in either interval $220_1$ or $220_2$.

Regardless of how the second time indication value is determined, in act 309, the controller sets the first time indication value (the CB hint) to represent the end of the current validity interval. This indicates to the requestor that it may request new credentials after the current validity interval ends.

Finally, upon determination of credential information, the controller may return that information to the requesting device, as shown in act $114_2$ of FIG. 3.

Alternatively, if the controller determined in act 304 that the stored credentials are not stale, corresponding to Table 2, then it may use the stored credentials or else it may compute new credentials, based on checking in act 312 whether it is operating within a transition interval. The determination in act 312 may be done, for example, by checking whether the local time indicates that the controller is within a threshold amount of time of a scheduled transition time. If the controller determines that it is within a threshold, then the controller may use the first credential in store as a new second credential, as in act 316, and it may compute a new first credential based on the next interval, as in act $306_3$. In Table 2, this scenario corresponds to a request arriving in interval $216_2$.

However, in this scenario the controller may not update these newly-determined credentials to its store and/or may not replicate these credentials to other controllers, as denoted by the "No" in the last column of Table 2 corresponding to the row of interval $216_2$. By foregoing or deferring storage and/or replication of credentials generated during a transition interval, inconsistencies with credentials from controllers that may not have yet updated their credentials at a corresponding scheduled transition time may be avoided.

The second time indication value is then set to represent the beginning of the next transition interval, as in act $310_2$. In Table 2, this scenario occurs when the request arrives in interval $216_2$, in which case the next starting time of a transition interval is $222_3$.

Subsequently, in step 309 the controller sets the first time indication value (the CB hint) to represent the end of the current validity interval. This indicates to the requestor that it may request new credentials after the current validity interval ends.

Finally, upon determination of credential information, the controller returns that information to the requesting device, as shown in act $114_2$.

If the controller determines in act 312 that it is not within a threshold, then in act 314, it uses the first and second credentials from its store. In doing so, the controller may be assuming that, outside of the transition interval, other controllers all share the same credentials as itself. Furthermore, the controller sets the second time indication value (the NC hint) to represent the time until the beginning of the next transition interval, as in act $310_2$. In Table 2, this scenario can occur if the request arrives in either interval $220_1$ or $220_2$, in which case the next transition interval will begin either at time $222_2$ or $222_3$, respectively.

Subsequently, in step 309 the controller sets the first time indication value (the CB hint) to represent the end of the current validity interval. This indicates to the requestor that it may request new credentials after the current validity interval ends.

Finally, upon determination of credential information, the controller returns that information to the requesting device, as shown in act $114_2$.

In the preceding discussion, the credentials consisted of a first credential, a second credential, and first and second time indication values. However, it is appreciated that there may be other suitable embodiments for credential information.

The preceding described some possible embodiments of how a computing device, such as a controller, may issue credentials differentially based upon the timing of a request for credentials. The following discussion presents some embodiments of how a host computing device may use the credential information provided by the controller to differentially use credentials based on timing and/or a nature of an authentication function to be performed using the credentials.

Figure 4B:
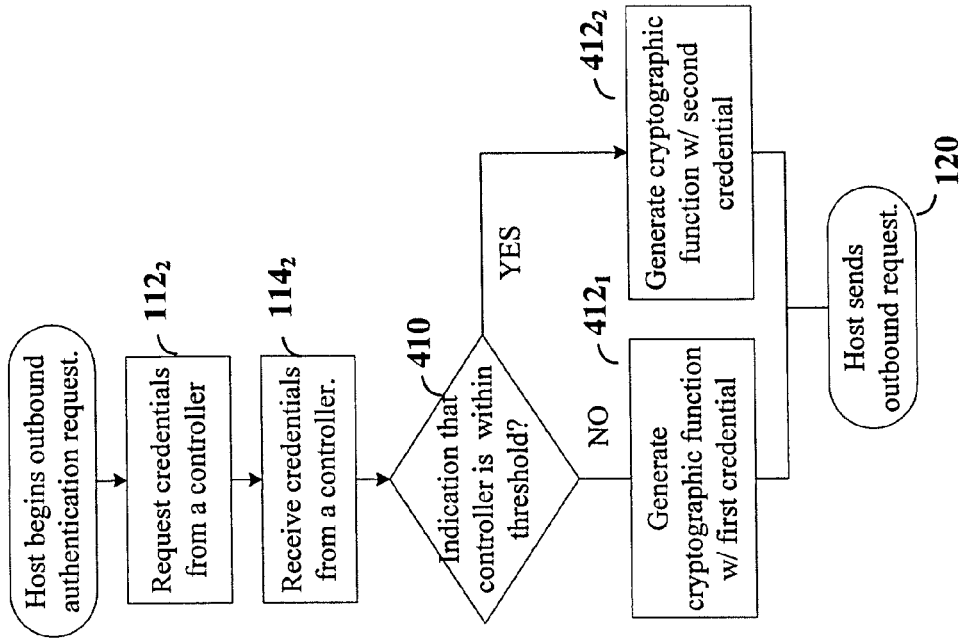
FIG. 4B is a flow chart of a method of performing an authentication function involving an outbound authentication request using credential information generated according to the method of FIG. 3.
Figure 4A:
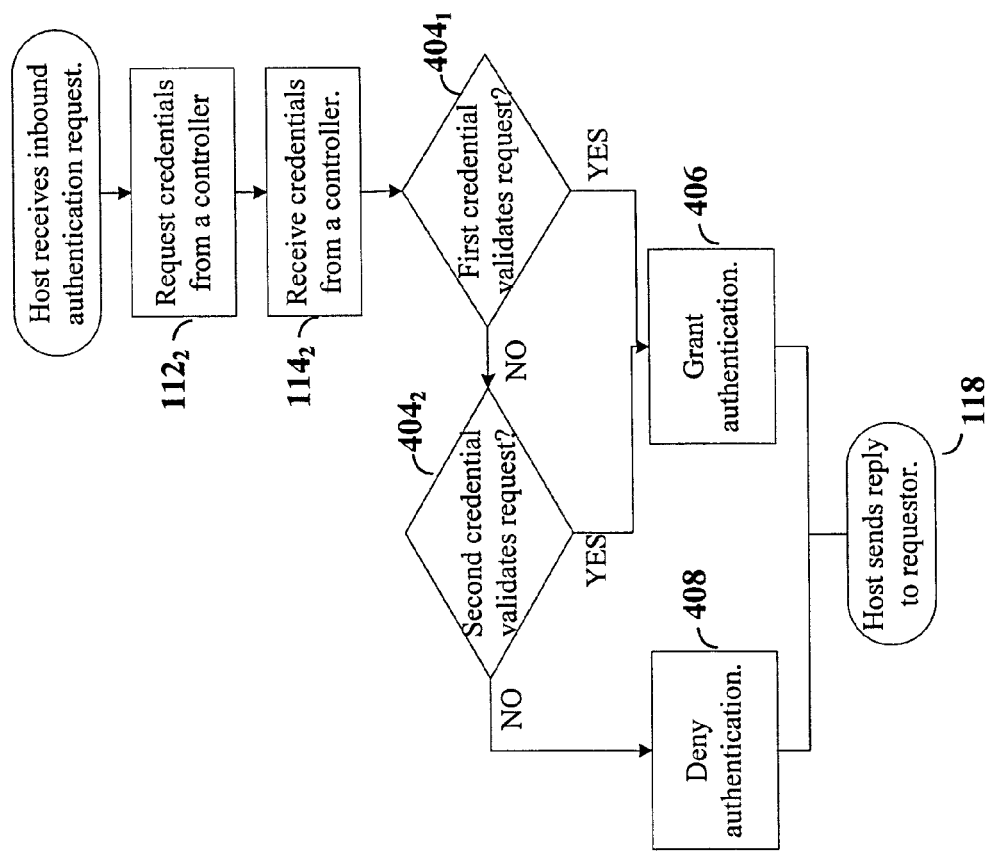
FIG. 4A is a flow chart of a method of performing an authentication function involving an inbound authentication request using credential information generated according to the method of FIG. 3.

FIG. 4A shows acts in a representative embodiment of how a device, such as a host, may differentially use credentials based on the timing and nature of an authentication function. In this particular example, the host may receive a request from another device to authenticate an object that was sent by that device. This request may be, for example, an "inbound" request for authentication from a client, as shown in FIG. 1B.

Regardless of the nature of the request, in act $112_2$, the host may first request credentials from a controller. In a scenario in which the request is directed to a service executing on the host, the request may be for credentials associated with an account under which an instance of that service executes on the host. However, the specific reason for the credential request is not important to the invention, as embodiments may be implemented for any number of uses. Moreover, it is not a requirement that the credentials be requested to process every request. Because credentials are valid for a validity interval, act $112_2$ may be performed when the host does not have current credentials.

Regardless of when the request is made, the host may then receive a response that contains credential information in step $114_2$. This credential information may include a first and second credential.

The host may then proceed to check if either the first or second credential validates the inbound request, in steps $404_1$ and $404_2$, respectively. This may be done, for example, by applying a cryptographic function to the received object, using a credential. If either credential validates the request, then the host may decide to perform an action in 406 in response to the requesting device. For example, this action may be to grant authorization for access to particular data or services.

Otherwise, if neither the first nor second credential validates the object sent by the requestor, then the host may perform another type of action in 408. For example, this may be to deny authorization to particular data or service.

Regardless of the action taken, the host may then send back a response to the requestor in step 118. In this scenario, the response indicates whether the request may indicate whether an entity generating the request was authorized to receive a service provided by the host. It should be appreciated, however, that the specific authentication function performed is not critical to the invention. Rather than validating a request, the host, for example, may use the credentials to decrypt a document or perform any other suitable authentication function.

FIG. 4B shows a scenario in which a host may begin another type of authentication function. This authentication function, for example, may be designed to generate an object, using credentials for a particular entity, that will be authenticated by another device. The object may be any suitable object, whether a single value, a blob (Binary Large OBject), or data in any suitable form. Examples of objects may include tokens, certificates, encrypted challenge phrases or signed challenge phrases. In this example, this process may occur during an "outbound" authentication request, as shown in FIG. 1C, in which the host requests a secure transaction from another device, such as a server.

Regardless of the exact nature of this authentication function, in step $112_2$, the host may request credentials from a controller, and receive back credential information in step $114_2$.

The host may then behave differently based on whether the controller was in a transition interval. A determination of whether the controller was in the transition interval may be made in any suitable way. At act 410, a determination may be made whether, at the time at which the credentials were generated, the controller was within some threshold amount of time of a scheduled transition time. This determination may be made, for example, by using the indication in the received credential information. In some embodiments, the indication may have two time indication values, in which case the host may determine that the controller is within a threshold time of the scheduled transition if the first time indication value (CB hint) is less than the second time indication value (NC hint). For example, in Table 2, this occurs in the row corresponding to interval $216_2$. Regardless of how the determination in act 410 is made, the host may then generate a cryptographic function using either the first or second credential received from the controller.

If the host determines that the controller is not in a transition interval, then the host may, in act $412_1$, use the first credential in a cryptographic function to generate a value that may be authenticated by another device. Alternatively, if the host determines that the controller is within a threshold, then in act $412_2$, the host may use the second credential in a cryptographic function to generate a value that may be authenticated by another device. The first credential may correspond to a current validity, as measured by the device that generated the credential. The second credential may correspond to the preceding validity interval.

Regardless of which credential was used, the host may then send the generated value to another device in act 120 to request some authentication function.

In some embodiments, controllers may renew credentials for each account that they manage such that current credentials are available in each validity interval. For controllers that manage large numbers of credentials, the computational load and/or other resource usage within a distributed system may be very large when credentials need to change. Such would be the case if multiple entities require changes at the same time. Computing new credentials on each controller may similarly consume substantial system resources. Even though there may be some skew in the clocks of the various controllers, such a scenario might create a "replication storm" as multiple controllers computed credentials for multiple entities, potentially drawing on system resources.

Figure 5A:
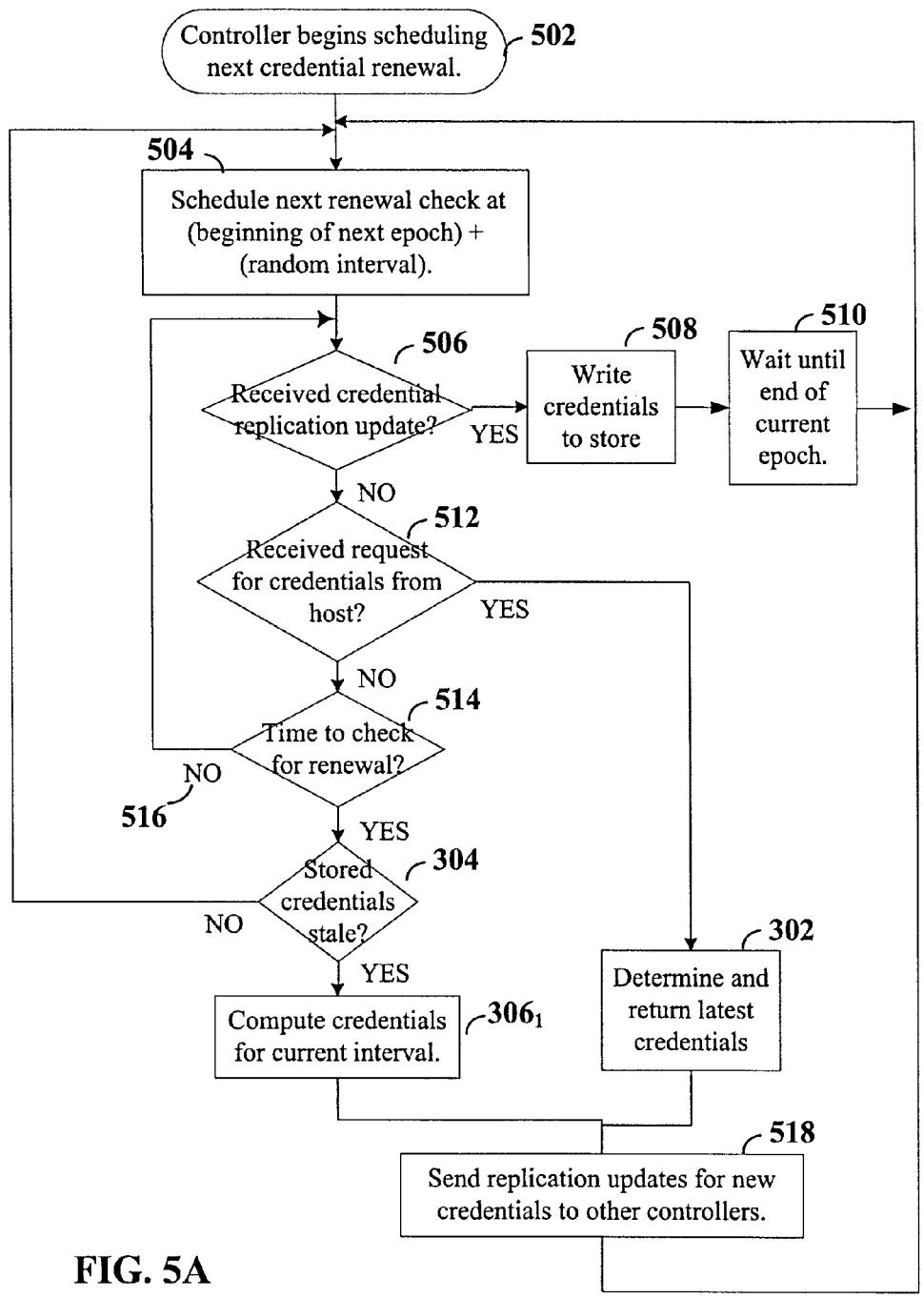
FIG. 5A is a flow chart of a method of generating time dependent credential information that reduces incidences of high computational demand on computing devices within a distributed system.
Figure 5B:
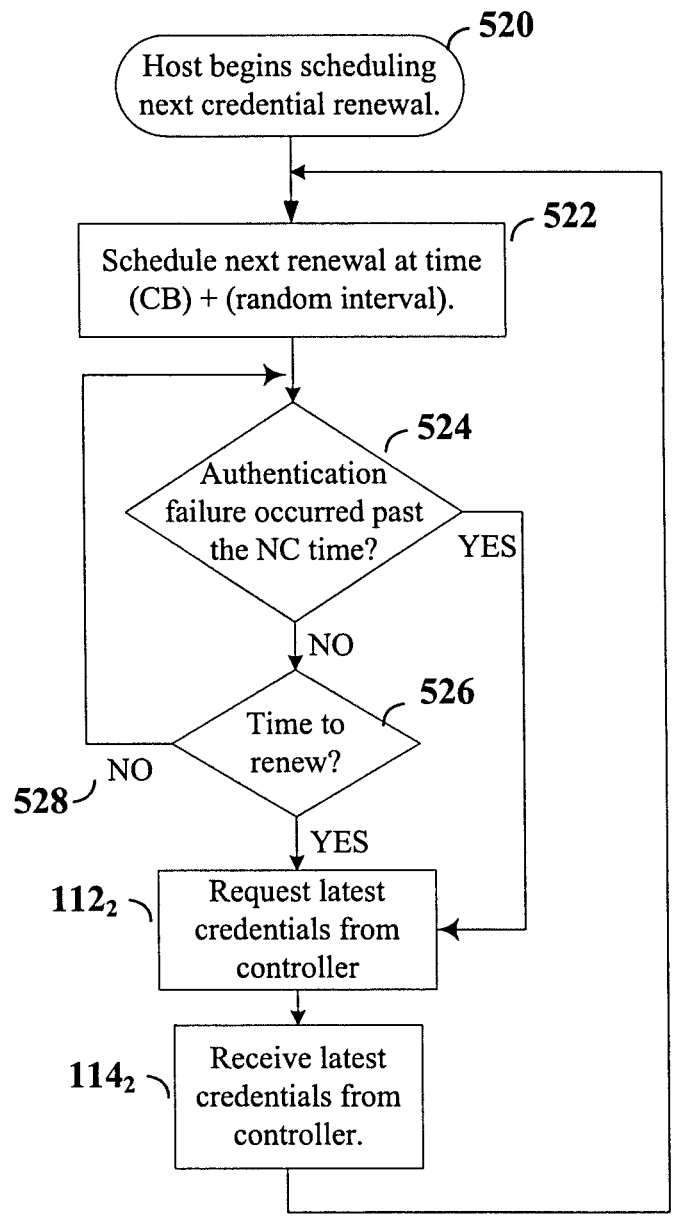
FIG. 5B is a flow chart of a method of operating a computing device that uses credential information within a distributed system that reduces instances of high computation load within the distributed system.

In some embodiments, credentials may be renewed in a way to reduce the likelihood and/or severity of a replication storm. FIGS. 5A and 5B show two possible embodiments for renewing credentials: controller-driven renewals and host-requested renewals. It is appreciated, however, that this invention is not necessarily limited to these two choices and the system may provide any suitable means for renewing credentials. In some embodiments, the times of renewal are offset by random delays from the scheduled renewal times. The purpose of this may be, among other reasons, to avoid excessive replication updates between controllers, which may all try to update credentials for a given entity at the same time.

FIG. 5A shows one possible embodiment of a controller-driven credential renewal. In such an embodiment, the controller runs a task at the beginning of every epoch to update all expired credentials, as in act 502. For simplicity, the FIG. 5A illustrates a method of having a separate process running for every entity to check at every epoch whether the credential for that entity has expired. Alternatively, a single process on the controller may periodically check all entities every epoch.

Regardless of how the controller triggers credential updates for multiple entities, it may schedule a renewal time for an entity's credential at the beginning of the next epoch plus a random offset, as in act 504. The random offset may be of any suitable duration. In some embodiments, the duration of the random offset may be between an upper and lower limit to ensure that, when a value is randomly selected between these limits, the times at which different controllers are scheduled to update the same credential, is spread over an interval that will exceed the amount of time for any controller to compute and replicate credentials.

As a result, while the controller is waiting, there is a probability that it may receive replication updates from other controllers in act 506, which would avoid the need for that controller to update the same credentials. If so, the controller may write that update to its local store, as in act 508. If a controller receives an update for the credential it was scheduled to update, it need not generate that credential and instead may wait until the end of the current epoch in act 510, before proceeding to schedule the next renewal.

Similarly, during the delay, the controller may receive, and therefore respond to, a request for credentials from a device, such as a host, in act 512. In this case, because the controller has not yet obtained credentials for its current validity interval, it may obtain the latest credentials, such as by performing the process 302, as described above in connection with FIG. 3. The controller may then proceed to replicate the credentials in its store to other controllers in act 518, and then return to schedule the next renewal.

It should be appreciated, however, that in process 302, the controller may or may not have actually computed new credentials and may or may not have written new credentials to its store. In some embodiments, if new credentials were not written to the local store, then the controller may choose to skip the replication of act 518 and simply schedule the next renewal.

Otherwise, if the controller has received no such interruptions in act 512, then in act 514 it checks to see if it has reached its scheduled time of renewal, and if not, then it returns to waiting in act 516.

If the controller does reach its scheduled time of renewal in act 514, then it may then proceed to check in act 304 whether the stored credentials are stale. If so, then the controller may compute new credentials for the current and previous interval in act 306, which is subsequently described in detail in FIG. 6. The controller may then send replication updates of its local store to other controllers in act 518, the purpose of which may be to update them with the newly-computed credentials. Afterwards, the controller may then proceed to schedule its next credential renewal.

If the controller determines in act 304 that its credentials in store are not stale, then this may indicate that it has not reached a transition time yet, so there is no need to renew. In this case, it goes back and schedules the next renewal check.

The preceding discussion described the case when a controller initiates its own credential renewal for a given entity, such as a user's account or any other suitable entity that may have credentials. FIG. 5B shows an alternative embodiment in which credential renewals are initiated by a host in act 520. FIG. 5B illustrates processing that may be performed on a host.

In this case, a host schedules its request for new credentials at a time provided by the indication in the credential information associated with the entity. For example, the indication may have a first time indication value (the "come-back" hint). Regardless of how the host determines this time, it may schedule a time for renewal by adding a random offset to the time provided by the indication, as in act 522. This random value may have any range of durations, including the range of durations of the random value in FIG. 5A, and may be selected in any suitable way. The host may then wait until that time to request an update from the controller.

While it is waiting, in step 524, the host may experience an authentication failure. In some embodiments, the host could request the current credentials to ensure that the failure was not the result of the host applying out of date credentials in attempting to perform an authentication function. However, in some embodiments, the host may selectively request updated credentials as a way to reduce load on the system. For example, the host may only request updated credentials if it is possible for it to receive different credentials than it already has. Accordingly, the response of the host to the authentication failure may depend on its current time relative to the time at which it most recently received updated credentials. If the authentication failure occurs an amount of time after the host most recently received updated credentials that is between the second time indication value (the "no change" hint) and its scheduled time for requesting a renewal, the host requests new credentials without waiting for the scheduled renewal time. The host may instead immediately request a renewal from the controller, which may be performed in accordance with the process 302 (FIG. 3).

Otherwise, the host proceeds to check if it has reached the time to renew at act 526. If it has not, then in act 528 the host returns to wait for the scheduled time. Otherwise, once it reaches the scheduled time to renew in step 526, the host may request the latest credentials from a controller in step $112_2$ and obtain the latest credentials in step $114_2$. The host may then proceed to schedule the next request for renewal, based on the "come-back" hint that it received in the latest credentials, such as is illustrated by the process returning to act 522.

Figure 6:
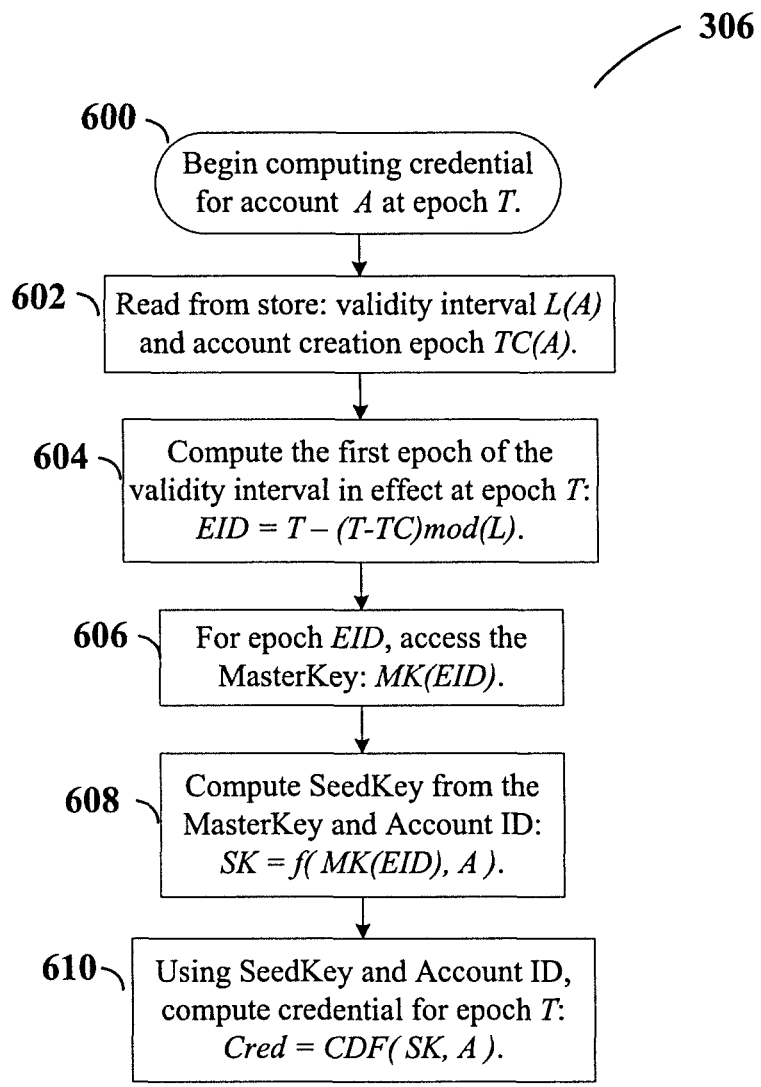
FIG. 6 is a flow chart illustrating a method of computing a time-dependent credential.

FIG. 6 shows method 306 of operating a computing device, such as a controller, to generate time-dependent credentials for an entity. An entity may be, for example, an account for a particular user or service. The type of entity for which credentials are generated, however, is not critical to the invention. This process may be repeated for any one or more entities at any one or more time and may generate different credentials for each of these entities in every validity interval—or at least with such randomness that it would be difficult to ascertain a pattern that would allow credentials generated for any entity at any time to be ascertained in an unauthorized manner.

In some embodiments, each account may be associated with information used in the generation of credentials. This information may include information that identifies the account and timing information that allows any controller to determine the start of a validity interval for the account. This information may include, for example: an account identifier A, an account creation epoch TC(A), and a credential validity interval, L(A). The names and numbers of these pieces of account information, however, may be any suitable value. Furthermore, the terms "time" and "epoch" may be used interchangeably here, as time may be measured in units of epochs or any other suitable unit.

In some embodiments, the controller may generate credentials using a "seed key" and the account identifier. The seed key may be implemented, for example, by using a global "master key" that may be known by one or more controllers. Such a master key may be provided in a number of different ways. For example, there may be a key distribution service (KDS), or any other suitable device, that provides a common master key to all controllers. This master key also may be renewed from time to time. For example, in some embodiments, there may be a refreshed master key associated with every time epoch.

In FIG. 6, the controller may begin computing credentials in act 600. This computation may result from a request for credentials that was sent by another device (as in FIG. 3), or it may result from an internally scheduled credential renewal (as in FIG. 5A). Though, method 600 may be performed at any suitable time in response to any suitable event. For a given request for credentials in epoch T, the controller may determine in act 602 the validity interval and account creation time of the requested entity. This information may be determined in any suitable way. It may be read form a data store, which may be maintained by the controller or at any suitable location within the distributed system. Alternatively, some or all of this information may be provided with a request for credentials.

Regardless of how this information is obtained, in act 604, the controller may compute the first epoch of the validity interval that contains epoch T. This value of the first epoch, which may be identified by an identifier EID (for Epoch ID) may be computed, for example, by using the formula:

$$EID=T-(T-TC)\bmod(L) \qquad (1)$$

Here, the mathematical operation "(x)mod(y)" denotes the remainder of dividing an integer x by an integer y.

Regardless of how EID is computed, there may be one EID associated with each validity interval, in such a way that EID provides a mapping between any epoch T and the corresponding validity interval that contains epoch T. In some embodiments, the EID may correspond to the first epoch of a validity interval, but in other embodiments, the EID may correspond to another appropriately defined identifier of a validity interval.

Regardless of how the epoch EID is determined, in some embodiments, the controller may then proceed, in act 606, to access the global master key associated with epoch EID. Then in act 608, the controller may use that master key, along with the account ID, to compute the seed key.

The aforementioned steps describe only one example of generating a seed key that is deterministically computable from a master key using knowledge of only a given time and account ID. Such an approach may allow one or more controllers to generate the same seed key in a distributed manner.

But regardless of how a seed key is generated, it may be used to generate credentials, in act 610, that have configurable lifetimes and are periodically updated in response to external events—either requests for latest credentials driven by member hosts, or scheduled updates that run on domain controllers.

Computing a credential for a preceding interval may be done in similar fashion by subtracting the validity interval L from the current epoch T, and running the credential generation algorithm for time (T−L). In particular, the EID used for the second credential may be computed by the following formula:

$$EID = (T-L) - (T-L-TC) \bmod (L) \qquad (2)$$

As before, the mathematical operation "(x)mod(y)" denotes the remainder of dividing an integer x by an integer y. Equations (1) and (2) represent two possible embodiments of determining identifiers for current and previous validity intervals corresponding to a given instance of time. However, the invention is not necessarily limited to these particular equations, and may use any other suitable means for computing identifiers for validity intervals for a given account at given instances of time.

These preceding steps offered some possible embodiments of how a controller may compute a first credential and second credential for any given time, based only upon knowledge of the account identity and a cryptographically secure master key that may be globally shared among controllers. However, it should be appreciated that the invention is not necessarily limited to these particular embodiments, and there may be other suitable ways to determine a time-dependent credential that is valid at a given instance of time.

Figure 7:
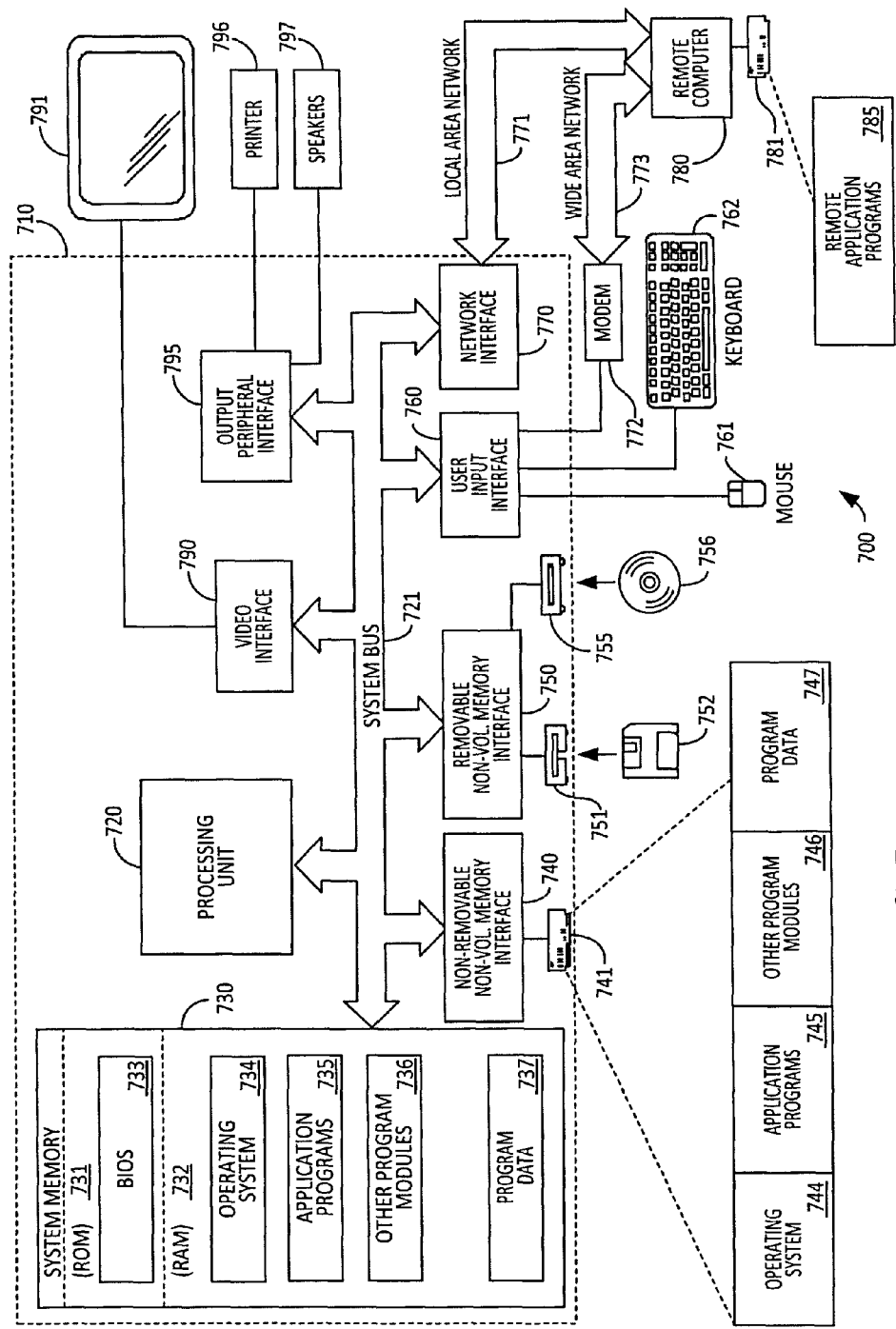
FIG. 7 is a schematic illustration of a representative computing device on which embodiments of the invention may operate.

FIG. 7 illustrates an example of a suitable computing system environment 700 on which the invention may be implemented. This computing system may represent any of the computing devices in the distributed system 100. For example, it may represent a host, such as 102₁, a controller, such as 104₁, a client 106, a server 108, or any suitable device operating in the distributed system. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a distributed computer system to provide time-dependent credentials, the method comprising:
   for each of one or more entities, with at least one processor, repeatedly generating credentials, each credential being valid for a first-type interval determined relative to a subset of a plurality of second-type intervals, the generating comprising determining for each of the one or more entities a time to generate the credential for a second first-type interval, the time being determined relative to an end of a first first-type interval, the time being offset from the end of the first first-type interval by a random time.

2. The method of claim 1, wherein:
   the method is performed on a controller of a plurality of controllers in the distributed computer system; and
   the method further comprises tracking time using a local timing source on the controller to identify the plurality of second-type intervals.

3. The method of claim 2, wherein:
   the distributed computer system comprises a plurality of controllers; and
   credentials are repeatedly generated on each of the plurality of controllers based on time tracked on the controller using the local timing source on the controller to identify the plurality of second-type intervals.

4. The method of claim 1, wherein:
   the first-type interval comprises an integer number of second-type intervals.

5. The method of claim 1, wherein:
   the method is performed on a controller of the distributed computer system; and
   the time to generate credentials is determined by a task executing on the controller.

6. The method of claim 1, wherein:
   the method is performed on a controller of the distributed computer system; and
   the time to generate credentials is determined by an arrival of a request to generate the credential at the controller.

7. The method of claim 1, wherein:
   the method is performed on a controller of a plurality of controllers in the distributed computer system;
   the method further comprises writing a received credential to a store in response to a replication out of changes from another controller of the plurality of controllers; and
   generating the credential for each entity at the determined time to generate comprises conditionally generating the credential by determining whether the credential has been generated for the second first-type interval and generating the credential when the credential has not been generated.

8. The method of claim 7, wherein:
   generating the credential comprises generating a credential for a first-type interval based on a master key shared by the plurality of controllers that is valid during a second-type interval aligned with the first-type interval.

9. At least one computer-readable storage medium, not comprising a signal per se, comprising computer executable instructions that, when executed by a computing device in a distributed computer system with a plurality of controllers, perform a method, the method comprising:

receiving credential information, the credential information comprising at least one credential and a timing value indicating a projected time at which an updated credential will be obtained from any of the plurality controllers; and requesting an updated credential at a random time determined relative to the projected time.

10. The at least one computer readable storage medium of claim 9, wherein:

the timing value is a first timing value; and
the credential information further comprises a second timing value indicating a projected time before which none of the plurality of controllers will supply an updated credential.

11. The at least one computer readable storage medium of claim 10, wherein:

the method further comprises, when the computing device experiences an authentication failure before a time indicated by the first timing value and after a time indicated by the second timing value, requesting an updated credential without waiting for the determined random time.

12. The at least one computer readable storage medium of claim 11, wherein:

the at least one computer-readable storage medium further comprises computer-executable instructions for implementing an instance of a distributed service.

13. The at least one computer readable storage medium of claim 12, wherein:

requesting the updated credential comprises sending a request to a device configured as a controller for the distributed computer system.

14. The at least one computer readable storage medium of claim 12, wherein:

the method further comprises, when the computing device experiences an authentication failure in connection with an access to the distributed service, outside a time interval between the times indicated by the second timing value and the first timing value, denying access to the service.

15. A networked system, comprising:

a computing device that is adapted to generate consistent credentials for each of a plurality of entities, the credential generated for each entity being different during each of a plurality of first-type intervals applicable to the entity, the computing device generating the credentials by:

tracking a plurality of second-type intervals of a common duration;
computing the credential for an entity by:
selecting a second-type interval of the plurality of second-type intervals based on credential refresh information associated with the entity, the selected second-type interval defining a start of a first-type interval; and
executing, at a time that is randomly offset from a reference time defined by the selected second-type interval, a cryptographic function to generate the credential for the entity that is valid during the first-type interval.

16. The networked system of claim 15, wherein:

computing the credential for an entity further includes randomly selecting a value that is between an upper limit and a lower limit as the offset.

17. The networked system of claim 16, wherein:

the computing device comprises a domain controller.

18. The networked system of claim 16, wherein:

the computing device responds to a request for a credential for an entity by selectively generating the credential, the selectively generating comprising:
if the request is received within a predetermined interval of the reference time:
generating the credential; and
returning, in response to the request, the generated credential;
if the request is received outside of the predetermined interval of the reference time:
retrieving the credential from a data store; and
returning, in response to the request, the retrieved credential.

19. The networked system of claim 18, further comprising:

a plurality of host computing devices, each of the plurality of host computing devices executing an instance of a service associated with the credential, each of the host computing devices being adapted to generate the request.

20. The networked system of claim 16, wherein:

the computing device is further adapted to determine randomly the offset for each of the plurality of entities.

* * * * *